United States Patent
Davies et al.

(10) Patent No.: US 9,167,617 B2
(45) Date of Patent: Oct. 20, 2015

(54) METHOD FOR COMMUNICATING IN A MOBILE NETWORK IMPLEMENTING DISCONTINUOUS RECEPTION

(75) Inventors: Robert James Davies, Milton (GB); Timothy James Moulsley, Caterham (GB); Milos Tesanovic, Swindon (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 725 days.

(21) Appl. No.: 13/380,333

(22) PCT Filed: Jun. 17, 2010

(86) PCT No.: PCT/IB2010/052738
§ 371 (c)(1),
(2), (4) Date: Dec. 22, 2011

(87) PCT Pub. No.: WO2010/150152
PCT Pub. Date: Dec. 29, 2010

(65) Prior Publication Data
US 2012/0106424 A1 May 3, 2012

(30) Foreign Application Priority Data
Jun. 26, 2009 (EP) .................................... 09163954

(51) Int. Cl.
*G08C 17/00* (2006.01)
*H04W 76/04* (2009.01)
*H04W 52/02* (2009.01)
*H04W 72/04* (2009.01)

(52) U.S. Cl.
CPC ........ *H04W 76/048* (2013.01); *H04W 52/0261* (2013.01); *H04W 72/0413* (2013.01)

(58) Field of Classification Search
CPC .................................................. H04W 76/048
USPC .......................................................... 370/311
See application file for complete search history.

(56) References Cited

U.S. PATENT DOCUMENTS

| | | | |
|---|---|---|---|
| 8,031,668 B2* | 10/2011 | Wang et al. | 370/329 |
| 8,195,164 B2* | 6/2012 | Kazmi | 455/436 |
| 8,804,628 B2* | 8/2014 | Kuo | 370/329 |
| 8,971,933 B2* | 3/2015 | Kitazoe et al. | 455/458 |
| 2007/0057767 A1 | 3/2007 | Sun et al. | |
| 2008/0102832 A1 | 5/2008 | Sengupta et al. | |
| 2009/0034452 A1* | 2/2009 | Somasundaram et al. | 370/328 |
| 2012/0106423 A1* | 5/2012 | Nylander et al. | 370/311 |

FOREIGN PATENT DOCUMENTS

| | | | |
|---|---|---|---|
| EP | 1973355 A1 * | 9/2008 | |
| WO | 03069934 A1 | 8/2003 | |
| WO | 2006037377 A1 | 4/2006 | |

* cited by examiner

*Primary Examiner* — Asad Nawaz
*Assistant Examiner* — Syed S Ali

(57) ABSTRACT

The present invention relates to a method for operating a network comprising a primary station communicating with a plurality of secondary stations, the method comprising the primary station communicating with a secondary station in a discontinuous mode; the secondary station transmitting to the primary station a control message based on the current status of the secondary station; the primary station changing a parameter of the discontinuous mode based on the control message.

41 Claims, 1 Drawing Sheet

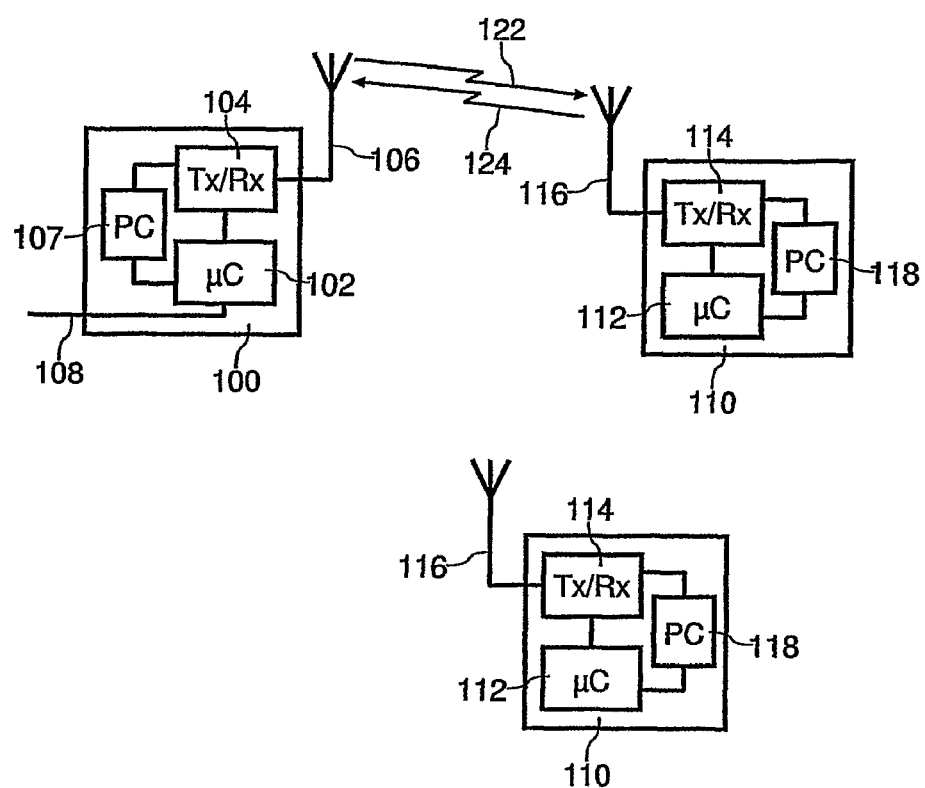

METHOD FOR COMMUNICATING IN A MOBILE NETWORK IMPLEMENTING DISCONTINUOUS RECEPTION

FIELD OF THE INVENTION

The present invention relates to a method for communicating in a network. More specifically, the present invention relates to communication between a primary station and a secondary station, in a telecommunication network, like a cellular telecommunication network (e.g. UMTS, UMTS LTE, GSM).

BACKGROUND OF THE INVENTION

In wireless packet-data networks with centralised control, a mechanism is required to enable a base station (or eNB in UMTS LTE terminology) to deliver both common and dedicated system control information to a number of mobile stations. Information of common interest to all such mobile stations may include system configuration, access information and so on. Information of dedicated interest to a particular mobile station (or mobile station group) may include indication of incoming user data, assignment of uplink resources and so on. Mobile stations are expected to monitor for messages containing such information and, when necessary, respond in a timely and appropriate manner.

In comparison to the majority of user data carried by such networks, system control messages of the type described constitutes a relatively low rate data stream, much of which is event-driven. Furthermore, the majority of dedicated system control information will be irrelevant to the majority of mobile stations. The monitoring of this information, particularly while a mobile station is in an inactive mode, consumes energy for, often, no benefit. For battery-operated mobile stations, this is of crucial importance because energy consumed by this monitoring process has a great impact on the station's autonomy. Accordingly, such networks make provision for mobile stations to monitor only a fraction of system control messages transmitted by a fixed station, ensuring, nevertheless, that the mobile station receives all information that is relevant to it. This implies a reception schedule observed by the mobile station and known to the fixed station. In a further means of reduction of energy consumption, the fixed station may transmit a plurality of pointers to updated common or new dedicated information; the mobile station, on receiving such a pointer can arrange to receive further transmissions as indicated or simply go back to sleep if none of the said plurality of pointers is relevant.

In some systems, for example, LTE Rel.8, the reception schedule is imposed by the fixed station. In the case of LTE, under a feature known as Discontinuous Reception (DRX), the fixed station may individually instruct each mobile station that is (wirelessly) connected to it to observe a reduced reception schedule, allowing it to miss a certain proportion of possible instances of scheduled transmissions. In principle, DRX parameters can be set to provide the best balance between responsiveness to incoming signals and messages on the one hand and battery life on the other.

In LTE, this process is handled by the Radio Resource Control entity at layer 3, which does not necessarily take into consideration the capabilities and current statuses of each mobile station thus addressed—nor, in fact, is it obliged to. As the spread of applications and range of physical embodiments of mobile stations both grow in response to the further flexibility of next generation standards, the centralised approach of release 8 becomes ever more a compromise. To take one example, mobile stations have increasingly sophisticated battery management systems and yet are unable to signal to the fixed station their current battery status. Such a station is obliged to conform to a preset cycle even if it becomes aware that its battery is perilously close to empty. Conversely, when placed on a charger, the same station is unable to signal that it is ready to adopt a faster wake-up cycle and thereby increase its responsiveness to incoming messages. In the case of embodiments in the form of computer data cards that can draw their power from the host computer, they may be sensitive to the host's own power management mechanisms and the communications requirements of applications running on the host.

What is needed is a means of allowing the mobile station to update the fixed station of its status in a dynamic manner.

In practice, the fixed station also has to balance its resources across the whole plurality of mobile stations connected to it. It therefore needs to retain overall control over the scheduling of system control information. Nevertheless, the possible rise of so-called femto cells could mean the existence of a whole class of LTE-based fixed stations each serving a relatively small number of mobile stations.

SUMMARY OF THE INVENTION

It is an object of the invention to propose a method which permits to increase the adequation of the discontinuous mode to the conditions experienced by the secondary station.

In accordance with a first aspect of the invention, it is proposed a method for operating a network comprising a primary station communicating with a plurality of secondary stations, the method comprising the primary station communicating with a secondary station in a discontinuous mode;

the secondary station transmitting to the primary station a control message based on the current status of the secondary station;

the primary station changing a parameter of the discontinuous mode based on the control message.

In accordance with a second aspect of the invention, it is proposed a primary station comprising control means for operating in a network and communicating with a plurality of secondary stations, the control means being arranged for communicating with a secondary station in a discontinuous mode;

the primary station comprising receiving means for receiving from the secondary station a control message based on the current status of the secondary station;

the control means being further arranged for changing a parameter of the discontinuous mode based on the control message.

In accordance with a third aspect of the invention, it is proposed a secondary station comprising communication means for communicating with a primary station in a discontinuous mode;

the secondary station comprising control means for transmitting to the primary station a control message based on the current status of the secondary station in order to change a parameter of the discontinuous mode.

As a consequence, the secondary station may indicate that the discontinuous communication mode is not compatible or not adequate to its current status, like its current battery level, or operation requiring a higher Quality of Service. The control message sent to the primary station may be an indication of the status or even a request indicative of a desired value of a parameter of the discontinuous mode.

The following embodiments are directed to a discontinuous reception mode but could be easily adapted to a discontinuous transmission mode as well.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram of a network in which the invention is implemented.

DETAILED DESCRIPTION OF THE INVENTION

The present invention relates to a method for communicating in a network, like a cellular network. For instance, the network may be a UMTS or LTE network as depicted on FIG. 1.

Referring to FIG. 1, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels.

In such a network, in order to reduce the power consumption, some communications may be discontinuous. It means that, for example, a downlink control channel dedicated to the secondary station 110 is transmitted by the primary station 100. Regular interruptions are scheduled, so that the secondary station 110 may switch off its transceiver means 104 during the interruption, and switches it back on when communication resumes. If data packets need to be transmitted to the secondary station, the primary station 100 indicates it when the secondary station is listening (not during interruption phases). Then, the secondary station 110 wakes up for the time of reception of the data packets, and can resume afterwards.

In accordance with some of the embodiments, the microcontroller 112 of the secondary station comprises power level detection means (not represented on FIG. 1) to monitor the power level of the energy storage or the battery of the secondary station.

The length of the interruption phases, the number of packets transmitted in the awake periods, the duty cycle of the discontinuous periods (i.e. the number of awake time slots per period over the number of time slots in a period) are decided by the primary station.

The proposed solution in the first embodiment permits the mobile station to transmit a request to the fixed station signalling one of or both of:
1. an indication of its current status
2. a desired range of DRX parameters (or a class of DRX parameters).

The fixed station may consider the request and respond accordingly.

DRX Request Procedure

In general, the procedure takes the following steps:

1. The mobile station shall issue a reconfiguration request message containing at least one of:
 a. an information element conveying the current status of the mobile station
 b. an information element indicating a desired range of DRX cycles
 c. an information element supplying other relevant information 2. The fixed station may then respond by issuing a new DRX configuration, a reject message indicating a reject reason or may choose not to reply at all.

3. The mobile station may then pursue the following actions:
 a. In the case that a new DRX configuration is received, the mobile station shall either implement the new parameters and possibly send an acknowledgement to the fixed station or retain the existing DRX parameters and indicate configuration failure to the fixed station. In both cases, existing procedures may be available.
 b. In the case that a reject message is received, the mobile shall retain the current DRX configuration. It should use the reason provided as input when considering transmitting a future request.

There are a number of particular embodiments possible. Some, non-limiting examples are discussed below.

In one embodiment, the status indication takes the form of an Information Element carrying information about the mobile station's current energy status and desired quality of service (QoS). The fixed station may then decide how to take into account the status information provided. These parameters can be encoded very economically. By way of non-limiting example, we show how assigning just two bits to each can provide a flexible signal to the fixed station.

In this example, the energy status information takes four states:

| State | Interpretation |
| --- | --- |
| 00 | Mobile station's battery is close to being depleted or mobile station has very limited power available |
| 01 | Mobile station has only a few hours of standby time remaining |
| 10 | Mobile station has healthy battery reserves |
| 11 | Mobile station has continuous source of external power |

State 00 indicates a near-empty battery or, possibly, a very low power node using energy scavenging techniques. State 11 indicates a mode in which energy-saving measures are not essential. The other two states indicate battery-powered modes in which energy saving is helpful. In this example, state 01 indicates an anticipated remaining lifetime, independent of fully-charged battery capacity. Another approach is to link state 01 explicitly to battery capacity, indicating, for example, less than 50% remaining. Other interpretations are also possible.

The desired QoS may be indicated as follows:

| State | Interpretation |
| --- | --- |
| 00 | No current communication requirements; long cycle only |
| 01 | Low data rate service with no latency |

| State | Interpretation |
| --- | --- |
| | requirement and/or regular packet-based service already configured (e.g., VoIP); long cycle only but with shorter value |
| 10 | High data rate service, no latency requirement; both long and short cycles set, low value for drxShortCycleTimer |
| 11 | Real time, low latency; both long and short cycles set, high value for drxShortCycleTimer |

The QoS states are chosen for their consequent impact on DRX operation in terms of settings for the long and short DRX cycles and the interval required to switch from short to long (drxShortCycleTimer).

Some possible interpretations are suggested; others will be obvious to persons skilled in the art. In particular, it should be noted that the combination of these bits with the power states presented earlier provides a measure of relative interpretation. For power state 11, for example, they can alternatively be interpreted as a 'willingness to listen', ranging from low responsiveness through medium and high to immediate. Combination with power state 00, can allow an interpretation that a mobile station will endeavour to maintain a certain DRX cycle but may miss a number of wake-ups due to energy scarcity. In general, with the format exemplified here, 16 states are possible. Other formats may provide fewer or more states.

Since this format is relatively compact, some embodiments may choose to transport this at a layer below RRC in LTE. In LTE, the MAC may be the most suitable layer, given that it is the layer that implements DRX. In some embodiments, they may be sent along with BSR or with power headroom reports.

Desired DRX Range

The mobile station may alternatively or additionally signal a desired range of values for the DRX cycles. DRX cycle lengths are indicated as multiples of subframes. Two sets of values shall be submitted, indicating max and min limits for both short and long cycles plus information on intervals in each mode.

From 36.331v8.5.0, values for long DRX cycle are chosen from the set {sf10, sf20, sf32, sf40, sf64, sf80, sf128, sf160, sf256, sf320, sf512, sf640, sf1024, sf1280, sf2048, sf2560}. Values for short DRX cycle are taken from the set {sf2, sf5, sf8, sf10, sf16, sf20, sf32, sf40, sf64, sf80, sf128, sf160, sf256, sf320, sf512, sf640}. Both sets have 16 values, meaning that each element can be represented by a 4-bit number. In one embodiment, advantage is taken of the idea that the second value of each limit must be greater than the first. If sf10 is chosen as the minimum limit for the long DRX cycle, the maximum limit can be chosen from 15 values. If sf20 is chosen as the minimum, the maximum can be chosen from 14 values and so on. A total of 64 combinations is possible, allowing a 6-bit encoding for the pair. Using a similar technique for the short DRX cycle, a total of 4 bits are saved, which can be used to encode the drxShortCycleTimer: the number of short cycles before the long DRX cycle is used. This has 15 values from 1 to 15. Value 0 is used to indicate that no short DRX cycle is requested. The complete range encoding takes 16 bits.

Procedural Operation

The procedure may operate in a stateless manner or under the operation of a procedural timer.

In the first case, after step 1, the mobile station considers the procedure completed. A response from the fixed station (i.e., step 2 above) is treated as a new process in its own right. This may use an existing configuration procedure, perhaps with an indication that the configuration is a response to a previous request.

In the second case, as part of step 1, the mobile terminal starts a timer. On receipt of a response from the fixed station in accordance with step 2, the timer is stopped. If the timer expires before such a message is received, the mobile station shall conclude that the fixed station has ignored the request. Depending on other factors, the mobile station may interpret this as an indication that the fixed station is currently too busy to respond to such requests or that the fixed station does not support such requests, in either case, adapting its future behaviour appropriately.

Rejection

If, as part of step 2, the fixed station issues a reject response, the mobile station may nevertheless interpret the response as an indication that the DRX request process is in general supported by the fixed station. Its subsequent behaviour may be influenced by the reject reason carried by the response. Some possible reasons and suggested mobile station behaviour are listed below as non-binding and non-limiting examples.

| Reason (fixed to mobile) | Possible supplementary information | Suggested mobile station behaviour |
| --- | --- | --- |
| Busy | Expected duration | Maintain current settings for at least the indicated duration before issuing a further request |
| | Flag | Maintain current settings. Do not issue further request until a flag is raised |
| Requested cycle time too short | | Request for more frequent cycle acknowledged; fixed station will endeavour to observe but does not guarantee. Mobile station can choose to observe requested higher frequency, up to the maximum specified, in case fixed station is able to exploit it. |
| Requested cycle time too long | | Indication of low energy state noted; fixed station will maintain current cycle but will repeat dedicated messages until response received/for n cycles. Mobile endeavours to receive at previously agreed intervals but will, in any event maintain at least the minimum schedule proposed. |

Operating Mode

The motivation for proposing this feature is the dynamic circumstances under which future mobile stations may find themselves. The default operation will be that the mobile station retains existing settings or adopts new assigned settings in accordance with instructions from the fixed station until further notice. Alternative modes include the following:

Timer-based: One side or other specifies a timer for which new, temporary settings will be valid. On timer expiry, the previous settings are restored. Since the timer is known to both sides, no message needs to be sent to confirm timer expiry and restoration of previous settings.

Periodic: The fixed station requests that the mobile station provide a DRX status update at periodic intervals. A separate periodic cycle is established by the mobile station or, alternatively, DRX signalling may be combined with periodic MAC layer signalling.

Asymmetric: Each side substantially observes a different cycle with knowledge of the peer's settings. Two examples in which this scenario might arise are implicit in the table above.

A mobile station desiring higher QoS might request shorter DRX cycles. If it cannot guarantee to maintain shorter DRX cycles for that mobile station, the corresponding fixed station may choose to respond to the mobile station that, although it only guarantees to observe the current schedule, it will attempt to observe the proposed shorter cycle when delivering dedicated control information to that mobile station. The mobile station may observe the shorter cycle but the fixed side may choose to retain the original, longer cycle (or an interim cycle) and switch between cycles without updating the mobile station. This is indicated by the 'requested cycle time too short' reason.

An alternative possibility is motivated by the possibility of very low power mobile stations, particular those adopting energy scavenging techniques. Such a station may indicate to the fixed station that it can only guarantee a certain longer cycle. The fixed station may nevertheless instruct the mobile station to observe a shorter cycle as best as possible, acknowledging that certain intervals may be missed by the mobile station due to energy constraints and undertaking to repeat missed messages as needed. This is indicated by the 'requested cycle time too long' response reason.

Since two cycles, short and long, and a short cycle duration can all be requested, reject responses may contain finer granularity than indicated here. It should also be noted that some of the 'teject' messages proposed are only partial rejects. In some cases, including such a reason with a new DRX configuration may be helpful.

Triggers

The DRX request procedure is initiated by the mobile station in response to local events. Two possible trigger events are a change in power status and a change in QoS requirements, as discussed above. However, some further events are discussed here, some of which overlap with each other and with the QoS and power events already discussed.

In a variant of the above embodiments, the trigger for modifying the discontinuous parameters are linked to the mobile station location and context.

Examples are mapping applications that can take into account the current physical location before recommending restaurants and other venues, and profiles that can take into account the current context of the user (at work, at home, shopping) when deciding whether to and how to alert him or her to an incoming event from a given caller. Examples of such location and context triggers include but are not limited to:

Time of day: switching between night and day (along with alarm); work/non-work; lunch breaks and so on Car: connection with car infrastructure, either by physical connection into cradle or by wireless connection via Bluetooth, WiFi or other such technology known to those skilled in the art PC: connection to PC or similar (set top box, games machine, home infrastructure, etc.) host In motion/not in motion: detection of movement via accelerometers, light sensors and other sensors Another change in the environment of the user equipment that could trigger the request of changing the discontinuous reception mode could be a change in connectivity.

On entering a premises, typically a café or a shop or a station, said premises including a wireless network comprising at least a first fixed station, a local networking means and a connecting means capable of connecting said local network to a first wide-area network, said first fixed station operating in conformance with a first international standard for wireless local area network, a mobile station, on detecting signals from said first fixed station, may switch a pre-existing connection made via a wireless connection to a second wide area network operating in accordance with a version of a second international standard known as LTE (or an equivalent technology of equal or lesser ability) from said second wide area network to said first wide area network via said first fixed station, local networking means and connecting means. The mobile station may then additionally transmit a signal to said second wide area network requesting a change in associated DRX settings.

Other changes may be triggered by changes on the network side, including:

Change of tariff

Handover to another cell or RAT (or provider)

To summarize the above embodiments comprises the implementation of a method for communicating between a primary station and a secondary station, comprising, at the secondary station, the transmission to the primary station status information. This status information may be at least one of:

a. Power supply status b. QoS requirement c. a request for at least one value of a set of possible values for one parameter of a set of MAC parameters to be signalled by the primary station to the secondary station.

and the primary station in response to the status information transmitting to the secondary station a value of at least one MAC parameter.

Advantageously, the signaling is to cause the change of a DRX cycle duration.

The invention may be applicable to cellular packet communication systems, mobile telecommunication systems like UMTS LTE and UMTS LTE-Advanced, or other networks implementing discontinuous reception or transmission.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a network comprising a primary station communicating with a secondary station, the method comprising:

in the primary station:
  a controller for:
    controlling a transceiver and antenna for
      communicating with the secondary station in a discontinuous mode;
      receiving a control message transmitted from the secondary station, the control message indicating at least one of a group of: a current status parameter value of the secondary station; and a requested parameter value of the discontinuous reception (DRX) mode of communication; wherein the request for the discontinuous mode parameter includes a desired range of values indicated as multiples of a subframe, said desired range of values comprising an indication of a maximum limit and a minimum limit of at least one of a group of: short DRX cycle duration; and long DRX cycle duration;
    determining a determined parameter value of the discontinuous mode in response to the indication in the control message;
    controlling the transceiver and antenna for transmitting to the secondary station, an indication of the determined parameter value of the discontinuous mode, in a request to adopt the determined parameter; and receiving from the secondary station an indication of a determination of whether the secondary station is complying with the transmitted request to adopt the determined parameter value.

2. A tangible computer-readable storage-medium that is not a transitory propagating signal or wave, the medium being modified with control information including instructions for performing the method of claim 1.

3. A primary station for communicating in a network with a secondary station, the primary station comprising:
controller configured to:
control a transceiver and an antenna that are configured to:
communicate with the secondary station in a discontinuous mode of communication, and
receive a control message transmitted from the second station indicating a least one of a group of: a current status parameter value of the secondary station; and a requested parameter value of a discontinuous reception (DRX) mode of communication of the secondary station, wherein the request for the discontinuous mode parameter value comprises a desired range of values indicated as multiples of a subframe, said desired range of values comprising an indication of a minimum limit and a maximum limit of at least one of a group of: a short DRX cycle duration; and a long DRX cycle duration; of the discontinuous mode;
determine a determined parameter of the discontinuous mode in response to the indication in the control message, and
control the transceiver and antenna to transmit to the secondary station, an indication of the determined parameter value of the discontinuous mode in a request to adapt to the determined parameter value.

4. The primary station of claim 3, wherein the primary station controller is configured to control the transceiver and the antenna to receive, from the secondary station:
an acknowledgement of receipt of the request to adapt to the determined parameter value.

5. The primary station of claim 4, wherein the acknowledgement indicates one of a group of: accept, to operate the secondary station according to the indication of the determined parameter value of the discontinuous value, and ignore, to operate the secondary station with a different previous parameter value of the determined parameter value.

6. The primary station of claim 3, wherein the control message comprises an indication of a parameter value of the status of the secondary station.

7. The primary station of claim 6, wherein the indication of the parameter value of the current status of the secondary station includes information on a battery level of the secondary station.

8. The primary station of claim 6, wherein the indication of the parameter value of the current status of the secondary station includes information on a quality of service (QoS) required by the secondary station.

9. The primary station of claim 6, wherein the indication of the parameter value of the status of the secondary station comprises an indication of an access possibility to a further network in a vicinity of the secondary station.

10. The primary station of claim 6, wherein the further network is a Local Area Network.

11. The primary station of claim 3, wherein at least one of the requested parameter value and the determined parameter value of the discontinuous mode comprises a period for communication in the discontinuous mode.

12. The primary station of claim 3, wherein at least one of the requested parameter value and the determined parameter value determined parameter value of the discontinuous mode comprises a duty cycle of communication in the discontinuous mode.

13. The primary station of claim 3, wherein receiving the control message from the secondary station indicates the secondary station detected an occurrence of an event of a predetermined group of events related to network communications.

14. The primary station of claim 13, wherein the event is one of the group of: a change in physical location, a change in a velocity, a change in an acceleration, a change in a motion, a change in a context, a change in connectivity in the network, a change in connectivity outside the network, a handover to a different cell RAT, a change in power, a change in quality of service (QoS), a time of day and an expiration of a timer.

15. The primary station of claim 3, wherein the indication of at least one of the requested parameter value and the determined parameter value represents one of a group of: the minimum value, the maximum value, a representation of the minimum value and the maximum value and a difference between the minimum value and the maximum value.

16. The primary station of claim 3, wherein the indication of at least one of the requested parameter value and the determined parameter value represents an encoded representation of the maximum value with respect to the minimum value.

17. The primary station of claim 16, wherein the encoded representation comprises a difference of the minimum value and the maximum value.

18. The primary station of claim 16, wherein the encoded representation comprises a code representing a combination of the minimum value and the maximum value.

19. The primary station of claim 3, wherein the determined parameter value of the discontinuous mode depends on the value of at least one of the group of parameters of the status of the secondary station comprising:
power supply status;
QoS requirement;
a request for at least one value of a set of possible values for one parameter of a set of MAC parameters to be signaled by the primary station to the secondary station; and the primary station in response to the status information transmitting to the secondary station a value of at least one MAC parameter of the group;
a short cycle minimum limit;
a short cycle maximum limit;
a long cycle minimum limit; and
a long cycle maximum limit.

20. The primary station of claim 3, wherein the control message from the secondary station requesting a parameter value for a discontinuous mode, requests that a parameter value be changed from a currently used parameter value to a different parameter value depending on an indication of at least one other parameter value in the control message.

21. A secondary station:
for communicating in a network, with a primary station in a discontinuous mode comprising:
a controller configured to:
determine a control message indicating at least one a group of: a current status parameter value of the secondary station; and a requested parameter value of a discontinuous reception (DRX) mode of communication of the secondary station, the requested parameter value a desired range of values indicated as multiples of a subframe, said desired range of values comprising an indication of a minimum limit and a maximum limit of at least one of a group consisting of: a short DRX cycle duration; and a long DRX cycle duration; of the discontinuous mode;

control a transceiver and antenna that are configured to:
transmit to the primary station, the determined control message;

and receive from the primary station an indication of a determined parameter of the discontinuous mode in a request to adapt to the determined parameter value; and determine whether to comply with the request to adapt to the determined parameter value.

22. The secondary station of claim 21, wherein the secondary station controller is configured to control the transceiver and antenna that are configured to transmit to the primary station, an acknowledgement of the receipt of the indication of the determined parameter value of the discontinuous mode.

23. The secondary station of claim 22, wherein the acknowledgement indicates one of the group of: accept, to operate the secondary station according to the indication of the determined parameter value of the discontinuous mode, and ignore, to operate the secondary station with a different previous parameter value than the determined parameter value of the discontinuous mode indicated in the request to adapt to the determined parameter value.

24. The secondary station of claim 21, wherein the control message comprises an indication of a parameter value of the status of the secondary station.

25. The secondary station of claim 24, wherein the indication of the parameter value of the status of the secondary station includes information on a battery level of the secondary station.

26. The secondary station of claim 24, wherein the indication of the parameter value of the status of the secondary station includes information on a quality of service (QoS) required by the secondary station.

27. The secondary station of claim 24, wherein the status of the secondary station comprises an indication of an access possibility to a further network in a vicinity of the secondary station.

28. The secondary station of claim 27, wherein the further network is a Local Area Network.

29. The secondary station of claim 21, wherein the determined parameter value of the discontinuous mode comprises a period for communication in the discontinuous mode.

30. The secondary station of claim 21, wherein the determined parameter value of the discontinuous mode comprises a duty cycle of communication in the discontinuous mode.

31. The secondary station of claim 21, wherein the secondary station transmits the control message to the primary station upon a determination of the occurrence of an event of a predetermined group of events related to network communications.

32. The secondary station of claim 31, wherein the event is one of the group of: a change in physical location, a change in a velocity, a change in an acceleration, a change in a motion, a change in a context, a change in connectivity in the network, a change in connectivity outside the network, a handover to a different cell RAT, a change in power, a change in quality of service (QoS), a time of day, and an expiration of a timer.

33. The secondary station of claim 21, wherein the indication of the determined parameter represents one of a group of: the minimum value, the maximum value, a representation of the minimum value and the maximum value and a difference between the minimum value and the maximum value.

34. The secondary station of claim 21, wherein the indication of the determined parameter value represents an encoded representation of the maximum value with respect to the minimum value.

35. The secondary station of claim 34, wherein the encoded representation comprises a difference of the minimum value and the maximum value.

36. The secondary station of claim 34, wherein the encoded representation comprises a code representing a combination of the minimum value and the maximum value.

37. The secondary station of claim 21, wherein the determined parameter value of the discontinuous mode depends on the value of at least one of the group of parameters of the status of the secondary station comprising:

Power supply status;

QoS requirement;

a request for at least one value of a set of possible values for one parameter of a set of MAC parameters to be signaled by the primary station to the secondary station; and the primary station in response to the status information transmitting to the secondary station a value of at least one MAC parameter;

a short cycle minimum limit;

a short cycle maximum limit;

a long cycle minimum limit; and a long cycle maximum limit.

38. The secondary station of claim 21, wherein the control message transmitted to the primary station requesting a parameter value for a discontinuous mode, requests that a parameter value be changed from a currently used parameter value to a different parameter value depending on an indication of at least one other parameter value in the control message.

39. A network comprising a primary station and a secondary station communicating in a network, wherein:

in the primary station:
a primary controller configured to:
control a primary transceiver and primary antenna that are configured to receive a control message transmitted from a secondary station, the control message indicating at least one of a group of: a current status parameter value of the secondary station; and a requested parameter value of a discontinuous reception (DRX) mode of communication of the secondary station; wherein the request for the discontinuous mode parameter value comprises a desired range of values indicated as multiples of a subframe, said desired range of values comprising an indication of a minimum limit and a maximum limit of at least one of a group of: a short DRX cycle duration and a long DRX cycle duration; of the discontinuous mode; and
determine a determined parameter value of the discontinuous mode in response to the indication in the control message; and
control the primary transceiver and primary antenna that are configured to transmit to the secondary station, an indication of the determined parameter value for the discontinuous mode; and in the secondary station:
a secondary controller configured to:
control a secondary transceiver and a secondary antenna that are configured to:
transmit to the primary station the control message; and receive from the primary station the indication of the determined discontinuous mode parameter value in a request to adopt the determined parameter value;

determine whether to comply with the received request to adopt the determined parameter value for the discontinuous mode; and control the secondary transceiver and secondary antenna to transmit an acknowledgment of receipt of the request to adapt the determined parameter value.

40. A method for operating a secondary station communicating in a network, with a primary station, the method comprising:

in the secondary station:
a controller to:
determine a control message indicating at least one of the group of: a current status parameter value of the secondary station; and a requested parameter value of a discontinuous reception (DRX) mode of communication of the secondary station; wherein the request for a discontinuous mode parameter value includes a desired range of values indicated as multiples of a subframe, said desired range of values comprising an indication of a minimum limit and a maximum limit of at least one of a group consisting of: a short DRX cycle duration and a long DRX cycle duration of the discontinuous mode;

control a transceiver and antenna to:
transmit the control message to the primary station; and
receive from the primary station an indication of a determined parameter value for the discontinuous mode in a request to adapt the determined parameter value; and determine whether to comply with the received request to adapt the determined parameter value for the discontinuous mode; and control the transceiver and antenna that are configured to transmit, to the primary station, an indication of receipt of the request to adapt the determined parameter value for the discontinuous mode.

41. A tangible computer-readable storage-medium that is not a transitory propagating signal or wave, the medium being modified with control information including instructions for performing the method of claim 40.

* * * * *